United States Patent
Guo et al.

(10) Patent No.: US 11,232,316 B2
(45) Date of Patent: Jan. 25, 2022

(54) IRIS OR OTHER BODY PART IDENTIFICATION ON A COMPUTING DEVICE

(71) Applicant: INTEL CORPORATION, Santa Clara, CA (US)

(72) Inventors: Donghai Guo, Shanghai (CN); Shuya Kevin Huang, Shanghai (CN); Jun Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/306,896

(22) PCT Filed: Jun. 28, 2016

(86) PCT No.: PCT/CN2016/087422
§ 371 (c)(1),
(2) Date: Dec. 3, 2018

(87) PCT Pub. No.: WO2018/000184
PCT Pub. Date: Jan. 4, 2018

(65) Prior Publication Data
US 2019/0236390 A1    Aug. 1, 2019

(51) Int. Cl.
*G06K 9/00* (2006.01)
(52) U.S. Cl.
CPC ..... *G06K 9/00912* (2013.01); *G06K 9/00255* (2013.01); *G06K 9/00604* (2013.01); *G06K 9/00617* (2013.01); *G06K 9/00892* (2013.01)

(58) Field of Classification Search
CPC .......... G06F 3/013; G06F 3/011; G06F 3/005; G06F 5/10; G06K 9/00597; G06K 9/00221; G09G 2340/0464
See application file for complete search history.

(56) References Cited

U.S. PATENT DOCUMENTS 9,280,652 B1 *  3/2016  Bozarth ............. G06K 9/00604
9,864,756 B2    1/2018  Park et al.
(Continued)

FOREIGN PATENT DOCUMENTS

WO    2016/060486 A1    4/2016

OTHER PUBLICATIONS

International Search Report and Written Opinion received for PCT Patent Application No. PCT/CN2016/087422, dated Mar. 21, 2017, 6 pages.
(Continued)

*Primary Examiner* — Dung Hong
(74) *Attorney, Agent, or Firm* — Hanley, Flight & Zimmerman, LLC

(57) ABSTRACT

An iris or other object detection method and apparatus are disclosed. In one embodiment, the method comprises sending image data to a display of a device that is captured with a first camera of the device with an indication to guide a user to position a body part of the user with respect to the display while the image data is being sent to the display, providing feedback to the user to indicate to the user that the body part is in position so that an image of the body part can be captured by a second camera of the device, capturing an image of the body part with the second camera, and performing recognition on the body part using the image.

24 Claims, 7 Drawing Sheets

(56) References Cited

U.S. PATENT DOCUMENTS

| | | | |
|---|---|---|---|
| 9,936,195 B2 | 4/2018 | Horesh | |
| 10,308,371 B1* | 6/2019 | Tiana | G01C 23/00 |
| 10,432,602 B2* | 10/2019 | An | H04L 63/10 |
| 10,620,457 B2 | 4/2020 | Ain-Kedem | |
| 2006/0192868 A1 | 8/2006 | Wakamori | |
| 2009/0050806 A1* | 2/2009 | Schmidt | H04N 5/23212 |
| | | | 250/332 |
| 2014/0055342 A1* | 2/2014 | Kamimura | G06F 3/013 |
| | | | 345/156 |
| 2015/0049179 A1* | 2/2015 | Son | G06K 9/00912 |
| | | | 348/78 |
| 2015/0243063 A1* | 8/2015 | Yoon | G06F 21/84 |
| | | | 345/634 |
| 2015/0347843 A1* | 12/2015 | Min | G06K 9/00617 |
| | | | 382/117 |
| 2016/0092720 A1* | 3/2016 | Lee | G06K 9/00604 |
| | | | 348/78 |
| 2016/0110601 A1* | 4/2016 | Son | G06K 9/00604 |
| | | | 382/117 |
| 2016/0125221 A1* | 5/2016 | Kim | G06K 9/00604 |
| | | | 382/117 |
| 2017/0017842 A1* | 1/2017 | Ma | G06K 9/00899 |
| 2018/0012007 A1* | 1/2018 | Kim | G06K 9/00617 |
| 2018/0144192 A1* | 5/2018 | Kim | G06F 21/32 |
| 2020/0125179 A1 | 4/2020 | Okuley | |

OTHER PUBLICATIONS

International Preliminary Report on Patentability received for PCT Patent Application No. PCT/CN2016/087422, dated Jan. 10, 2019, 5 pages.

The International Bureau of WIPO, "International Preliminary Report on Patentability," issued in connection with International Patent Application No. PCT/CN2016/087422 dated Jan. 1, 2019, 4 pages.

* cited by examiner

Wide View Angle Lens of
Color Camera Sensor
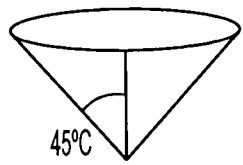
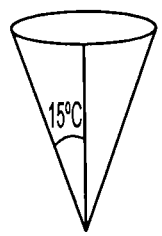
Narrow View Angle Lens with IR
Band Passing Filter
FIG. 2

IRIS OR OTHER BODY PART IDENTIFICATION ON A COMPUTING DEVICE

CROSS-REFERENCE TO RELATED APPLICATIONS

This patent application is a U.S. National Phase application under 35 U.S.C. § 371 of International Application No. PCT/CN2016/087422, filed Jun. 28, 2016, entitled "IRIS OR OTHER BODY PART IDENTIFICATION ON A COMPUTING DEVICE", the contents of which are incorporated herein by reference.

FIELD OF THE INVENTION

Embodiments of the present invention relate to the field of iris or other body part identification; more particularly, embodiments of the present invention relate to performing iris identification using three dimensional navigation through feedback to the user.

BACKGROUND OF THE INVENTION

The iris is a circular structure in the eye that controls the diameter and size of the pupil and therefore, controls the amount of light reaching the retina. Iris identification is a technique used to identify an individual using images of either or both irises of a person's eyes, Iris identification uses infrared camera technology in which a user's eyes are illuminated to acquire images of the iris. The images are then processed to identify an individual.

Today, in the application practice of IRIS recognition and verification technology, the camera systems have an IR band passing filter and a narrow view angled lens that are widely applied to obtain stable texture details of human eyes' iris without the interference of the viewable light, as well as to increase the reliability and performance of IRIS/texture recognition algorithm. The narrow view angled lens (20-30 degrees) can help to get the image of the same small size object such as human eyes represented with more pixels than done by the traditional lens (70-100 degree). The IR passing filter applied on the lens to help get the clear texture information of human eyes' iris, especially for Asian black/brown eyes' iris (where it is hard to get high contrast image details from the black eyes), under the near IR wavelength.

There are a number of problems associated with current systems. First, it is difficult to help the end user to navigate their head and eyes into the IR sensor's narrow viewable area, since the heads and eyes are often out of the viewable area in the most cases during navigation. Second, prior art systems often use a monochromatic image/stream caused by the IR band passing filter, which provides a bad user experience. Lastly, there is no automatic triggering of the raw data capture for the iris identification. Therefore, some form of face detection or blink detection is necessary in the camera system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2 illustrates the view angles for both an infrared camera and a color camera.

DETAILED DESCRIPTION OF THE PRESENT INVENTION

Figure 1:
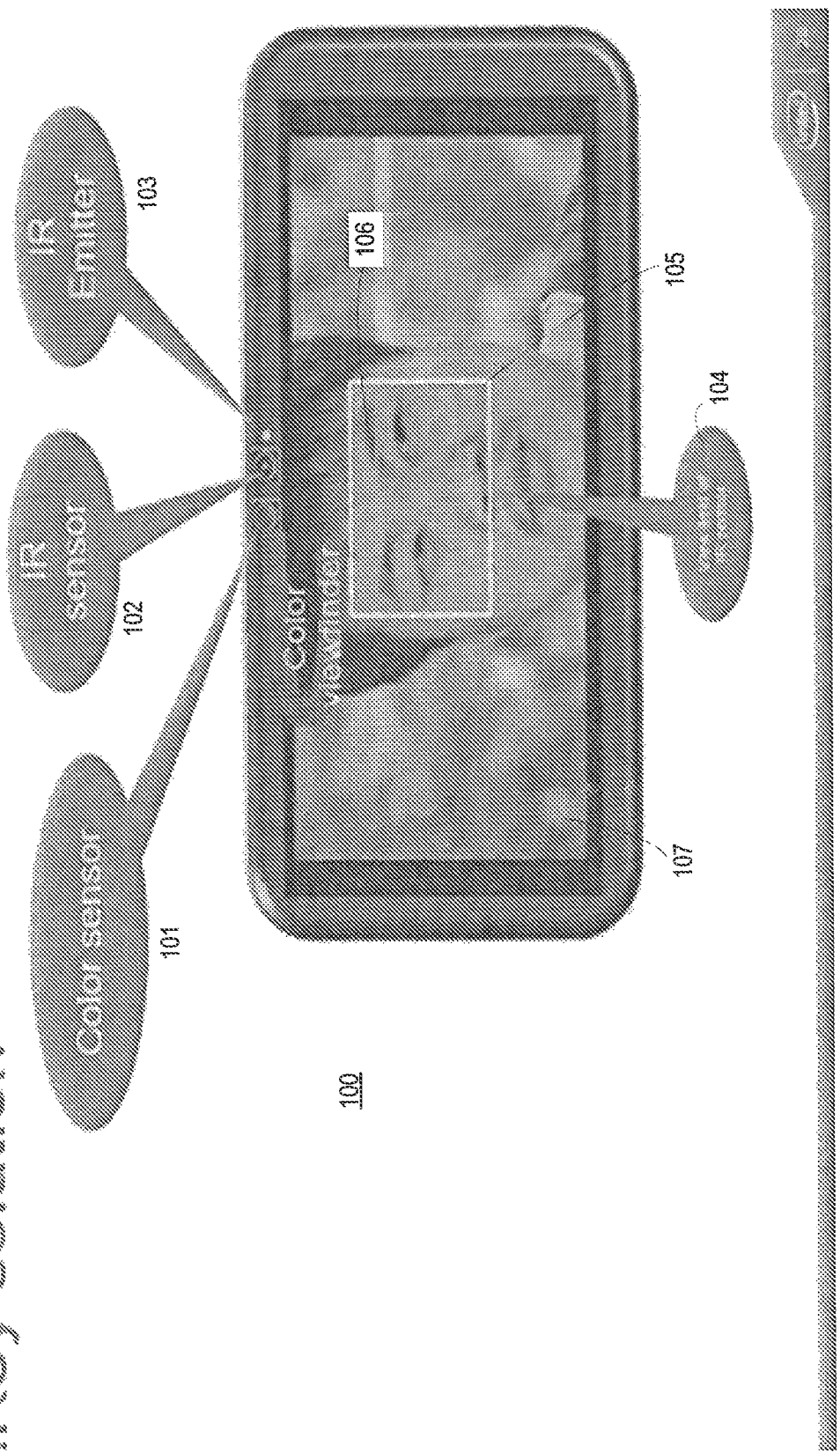
FIG. 1 is an example of one embodiment of a computing device.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for capturing and/or acquiring an iris image of an individual's (human) eyes with a computing device is disclosed. In one embodiment, the computing device comprises a tablet, phone, laptop computer system, 2 in 1 products, personal digital assistant, etc. In one embodiment, the techniques described herein are able to capture the iris image in focus to increase the performance and accuracy of IRIS recognition algorithm.

Techniques described herein help users easily show their faces and eyes in the focus area of the iris recognition specific camera that makes use of the narrow-view-angled (NVA) infrared (IR) lens (e.g., 30° diagonal view angle) to capture an iris image for an iris recognition application. The techniques utilize the characters and available features of the front color camera to assist the NVA IR camera to obtain a clear iris image for an iris recognition algorithm, thereby combining the advantages of two different camera systems to provide the friendly user experience on iris capture and recognition using the user-familiar color system without noticing the use of the NVA IR camera.

Note that although the description discusses the application of the techniques described herein to irises, the techniques are applicable to recognizing other body parts (e.g., faces) and/or other objects. In one embodiment, the computing system uses the existing wide field-of-view (FOV) traditional front color camera (e.g., 80° diagonal view angle) located nearby the iris recognition application-specific camera in the computing device to help the navigation of the head and eyes. Thus, the Field of View (FOV) of the front color camera is larger than the FOV of the NVA IR camera. Note an example of this is shown in FIG. 2.

According to the positions and lens parameters of the two cameras, the viewable area of the NVA IR camera can be mapped into an area in the viewable area of the front color camera. In one embodiment, the area is a rectangle that is displayed (the IR camera mapped rectangle). In one embodiment, the IR camera mapped rectangle shrinks or expands when the lens of NVA IR camera moves forward or backward during lens (auto) focusing. Using the wide view angled preview stream from the front color camera, an individual can see where the face and eyes are, and then easily navigate eyes into the IR camera FOV through IR camera mapped rectangle. Using well-known features of face detection, face component detection, and/or eye blink detections in color sensor 101, the recognition subsystem can detect when the face is moved into IR sensor mapped rectangle in the viewable area of color sensor 101. In one embodiment, the recognition subsystem automatically triggers capturing the IRIS image from IR camera using features of face detection, face component detection, and/or eye blink detections in the front color camera.

FIG. 1 is an example of one embodiment of a computing device. Referring to FIG. 1, tablet 100 comprises a color sensor (camera) 101, IR sensor (camera) 102, IR emitter 103, and display 107. Image data (e.g., a preview stream) captured by color sensor 101 is sent or streamed to display 107 with an indication to guide a user to position a body part (e.g., a user's eyes, face) with respect to the display. In one embodiment, the indication comprises a first graphic (e.g., a rectangle 105 or other shaped element) displayed on the display that is mapped to the field of view 104 of IR sensor 102. By looking at the display, the user positions the body part that is to be recognized their eyes) into the graphic (e.g., rectangle) to enable capture of the image of the body part by IR sensor 102.

The indication is not limited to being a graphic element. For example, in one embodiment, the indication comprises both text and graphics on the display to direct the user to position the body part with respect to the display. In another embodiment, the indication comprises one or more of light(s) (e.g., light emitting diodes (LEDs)) on the display or audio to direct the user to position the body part with respect to the display.

The computing device includes a feedback mechanism to provide feedback to the user to indicate to the user that the body part is in position for image capture by IR sensor 102. In one embodiment, IR sensor 102 captures an image of the body part automatically once the feedback mechanism indicates the body part is in the proper position (e.g., the correct focal depth) for image capture by IR sensor 102. In one embodiment, the feedback mechanism is operable to detect whether the body part is positioned in the area of the display mapped to the field of view of IR sensor 102 such that a suitable image can be captured by IR sensor 102. In the case of iris identification, a suitable image is one that shows the irises of the user's eyes in enough detail to allow iris identification to be performed.

In one embodiment, the feedback comprises changing a color of the graphic. For example, the feedback mechanism may change the color of rectangle 105 from one color (e.g., yellow) to another color (e.g., green, such as in graphic element 106). In another embodiment, the feedback mechanism replaces one graphic with another graphic. For example, rectangle 105 is displayed to guide a user to position their eyes within rectangle, and when the user's eyes are in the position to enable an image to be obtained that is suitable for iris detection, rectangle 105, which is yellow, is replaced with green squares 106, thereby signaling the user that he/her are in proper position.

In one embodiment, the two smaller rectangles 106 are also used by the user to navigate/position his eyes forward or backward (zoom in or zoom out) along with the horizontal (right/left) and vertical (up/down) movements, thereby providing a full 3D navigation. This is needed in cases where the field depth and focal distance of the lens of the front color camera is different than that of the iris IR camera. Note that such is often the case for the iris IR camera application because a camera with a short focal distance and a short field of depth camera lens is used to capture more details of the small size object (eyes). Thus, 3D navigation is used for capturing a clear iris image.

In one embodiment, the computing device includes a processor (e.g., central processing unit (CPU), system-on-a-chip (SOC), controller) to perform recognition on the body part using the image captured by IR sensor 102.

Figure 3:
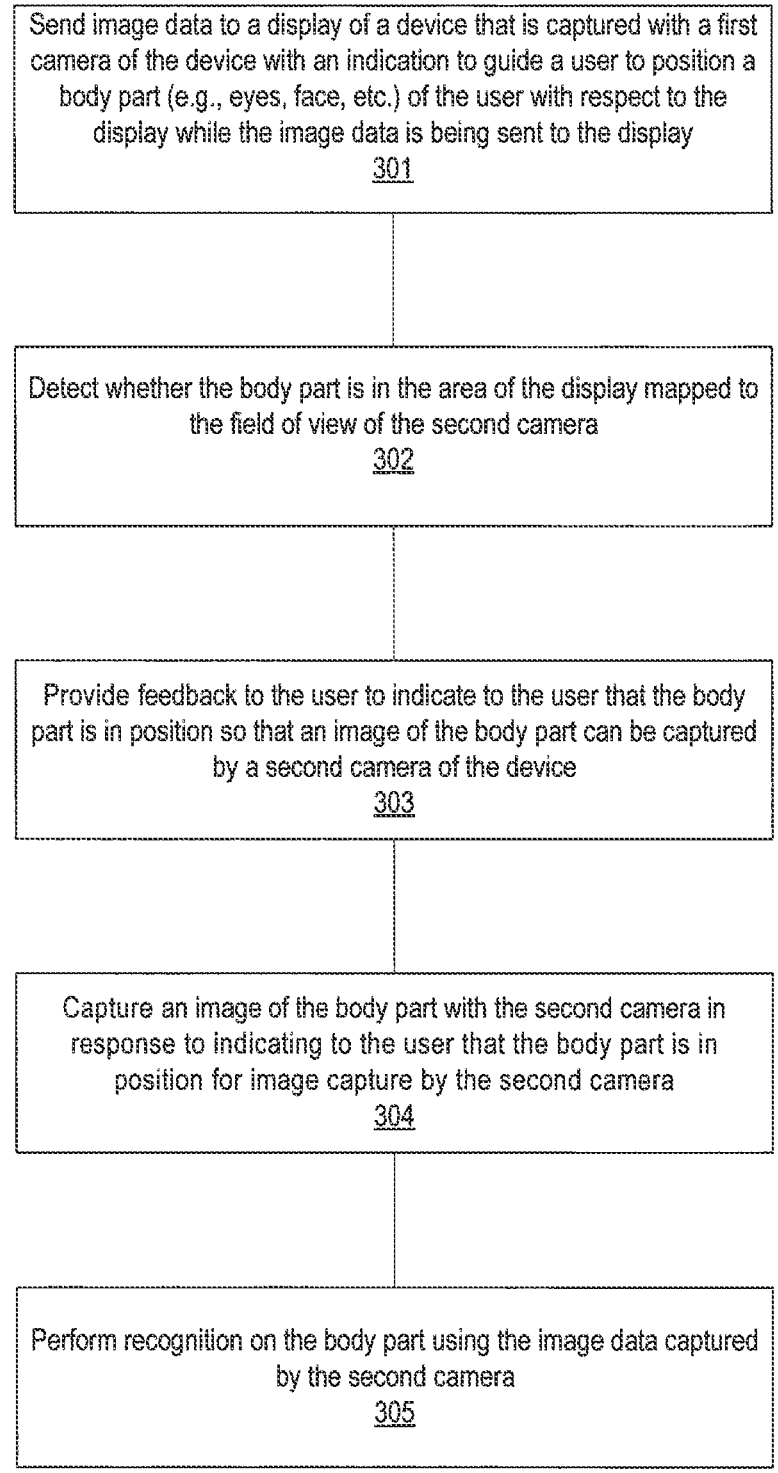
FIG. 3 is a flow diagram of one embodiment of a process for assisting the capture of an iris image through a narrow view angled IR camera.

FIG. 3 is a flow diagram of one embodiment of a process for assisting the capture of an iris image through a narrow view angled IR camera. The process is performed by processing logic that may comprise hardware (circuitry, dedicated logic, etc.), software (such as is run on a general purpose computer system or a dedicated machine), firmware, or a combination of the three.

Referring to FIG. 3, the process begins by sending image data to a display of a device that is captured with a first camera of the device with an indication to guide a user to position a body part (e.g., eyes, face, etc.) of the user with respect to the display while the image data is being sent to the display (processing block 301). In one embodiment, the first camera is a red-green-blue (RGB) camera. In one embodiment, the indication comprises a first graphic displayed on the display that is mapped to the field of view of a second camera and into which the body part is positioned on the display to enable capture of the image of the body part. In one embodiment, the second camera is an IR camera. In one embodiment, the indication comprises one or both of text and graphics on the display to direct the user to position the body part with respect to the display. In another embodiment, the indication comprises using one or more of light on the display or audio to direct the user to position the body part with respect to the display.

Processing logic detects whether the body part is in the area of the display mapped to the field of view of the second camera (processing block 302) and provides feedback to the user to indicate to the user that the body part is in position so that an image of the body part can be captured by a second camera of the device (processing block 303). In one embodiment, the feedback comprises replacing the first graphic with a second graphic. In another embodiment, the feedback comprises changing a color of the first graphic.

In response to indicating to the user that the body part is in position for image capture by the second camera, processing logic captures an image of the body part with the second camera (processing block 304).

Using the image data captured by the second camera, processing logic performs recognition on the body part using the image (processing block 305). In one embodiment, the body part comprises eyes of the user and performing recognition on the body part comprises performing iris recognition. In one embodiment, the body part comprises a face of the user and performing recognition on the body part comprises performing face recognition.

On a computing system (e.g., a phone, a tablet system, etc.) with iris recognition feature based on a narrow view angled IR camera as described herein, the system can capture the iris image for iris recognition and verification only with the preview stream from the front color camera showed or without showing the preview stream from IR camera.

Figure 4:
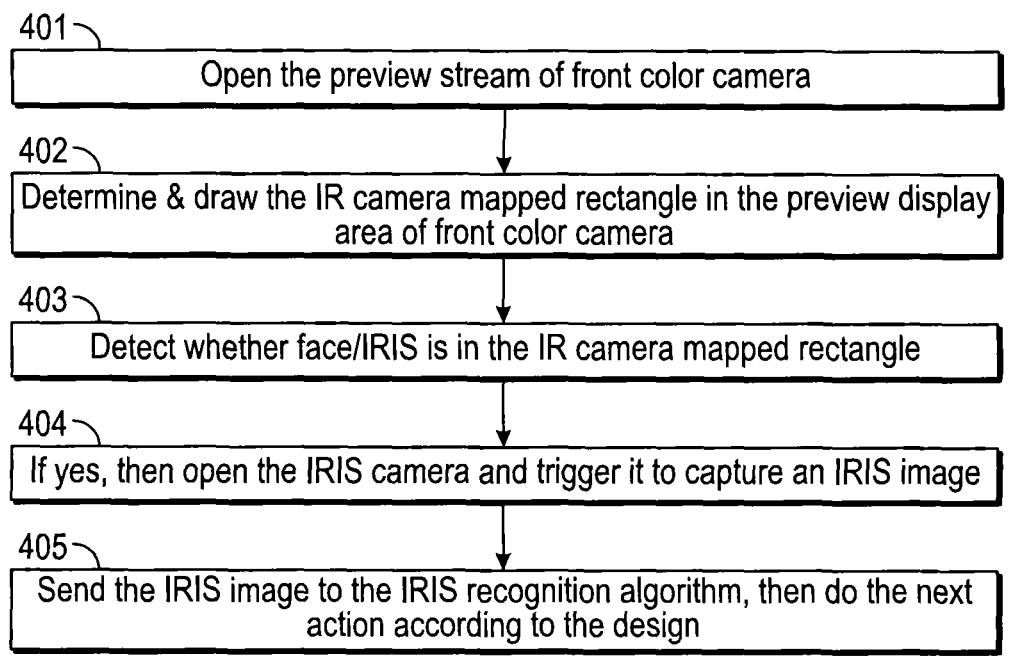
FIG. 4 is a more detailed flow diagram of another embodiment of a process for assisting the capture of an iris image through a narrow view angled IR camera.

FIG. 4 is a more detailed flow diagram of another embodiment of a process for assisting the capture of an iris image through a narrow view angled IR camera. The process is performed by processing logic that may comprise hardware (circuitry, dedicated logic, etc.), software (such as is run on a general purpose computer system or a dedicated machine), firmware, or a combination of the three.

Referring to FIG. 4, the process begins by opening the preview steam of a front color camera on a device (processing block 401). Next, processing logic determines and draws the IR camera mapped rectangle (i.e., graphic element) in the preview display area of the front color camera on the screen of the device (processing block 402). Processing logic detects whether the face and/or iris is in the IR camera mapped rectangle (processing block 403). If so, processing logic opens the iris camera and triggers it to capture an iris image (processing block 404). In one embodiment, processing logic triggers the iris camera to take a picture automatically when the face and/or iris is in the IR camera mapped rectangle.

After capturing the iris image, processing logic sends the iris image to an iris recognition procedure, which performs recognition using the iris image (processing block 405). Based on the results of the iris recognition procedure, processing logic takes one or more actions. For example, the iris recognition procedure may be used to determine authenticate a user to gain access to the device in the same way as a password is used.

Figure 5:
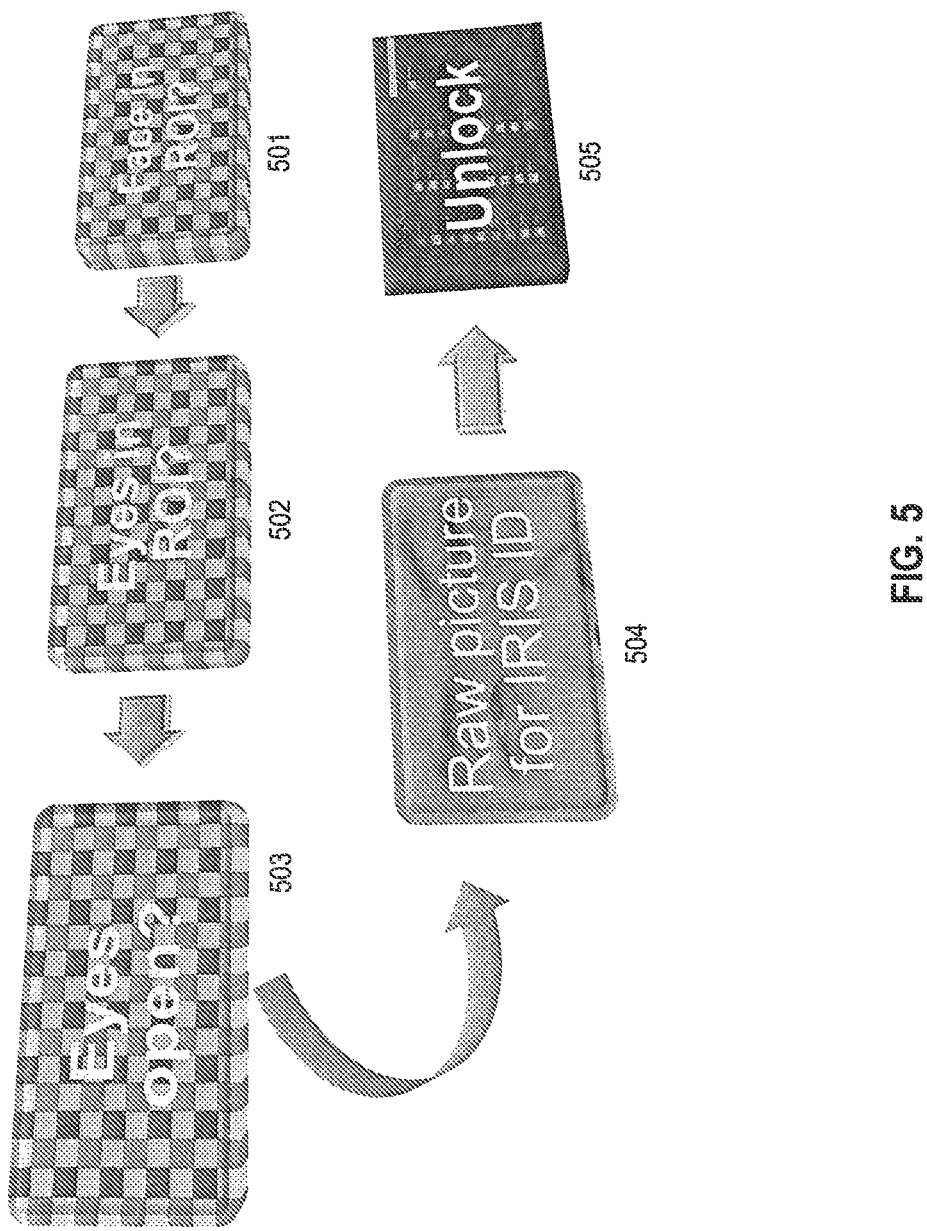
FIG. 5 illustrates a flow diagram of an application usage scenario to unlock a device performing the iris recognition.

FIG. 5 illustrates a flow diagram of an application usage scenario to unlock a device performing the iris recognition. The process is performed by processing logic that may comprise hardware (circuitry, dedicated logic, etc.), software (such as is run on a general purpose computer system or a dedicated machine), firmware, or a combination of the three.

Referring to FIG. 5, processing logic determines whether the user's face is in the region of interest (ROI) (processing block 501). Once that occurs, processing logic determines whether the user's eyes are in the ROI (processing block 502). Once the user's eyes are in the ROI, processing logic determines whether the user's eyes are open (processing block 503). This may be performed using well-known techniques such as those, for example, associated with blink detection and/or face component detection.

If the eyes are determined to be open, processing logic causes the camera to take a picture for use in iris identification (processing block 504). In one embodiment, this occurs automatically once the eyes are determined to be open.

If, as a result of performing iris identification, processing logic determines whether the iris matches an individual with access rights to a device, then processing logic unlocks the device (processing block 505).

Figure 6:
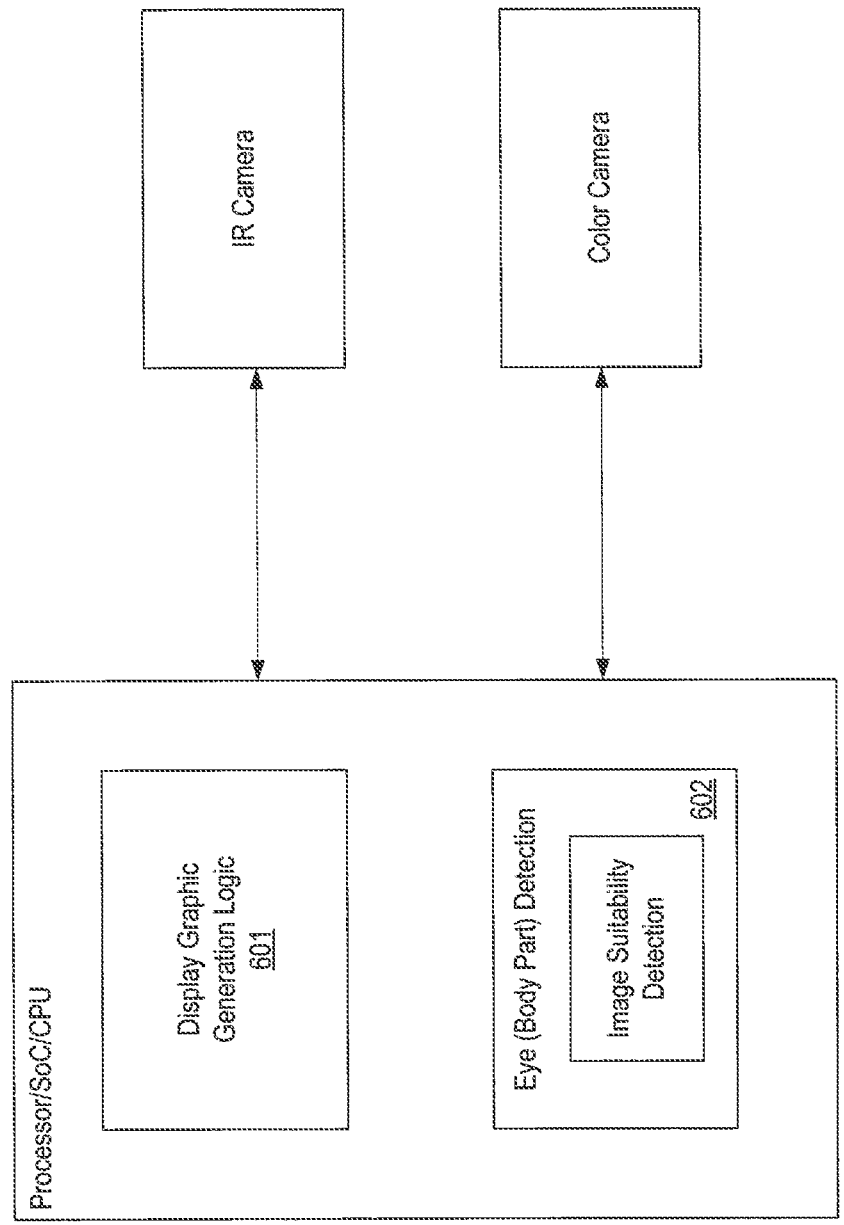
FIG. 6 illustrates one example of the interaction between eye detection logic and display graphic generation logic.

In one embodiment, the eye detection logic to detect when the eyes (or other body part) is in the IR camera mapped rectangle operates in conjunction with the display graphic generation logic to assist the capture of an iris image. FIG. 6 illustrates one example of the interaction between eye detection logic and display graphic generation logic. The logic may comprise hardware (circuitry, dedicated logic, etc.), software (such as is run on a general purpose computer system or a dedicated machine), firmware, or a combination of the three.

Referring to FIG. 6, display graphic generation logic 601 generates the display data with the graphic indication (e.g., rectangle mapped to the IR camera view field) to guide the user to position their body part within the guide. Once display graphic generation logic 601 generates the display data with the graphic indication, display graphic generation logic 601 signals eye detection logic 602 to start detecting when the user's eyes are in the proper position to take an IR image. The signaling may comprise sending a message.

Once eye detection logic 602 detects that the user's eyes are in the proper position, eye detection logic 602 signals messages) display graphic generation logic 601 so that display graphic generation logic 601 can generate a new graphic element. In one embodiment, this is the same graphic element but with a different color. In another embodiment, the graphic element changes a yellow rectangle is changed to two green squares surrounding a user's eyes.

In one embodiment, eye detection logic 602 includes logic to determine if the eyes are suitably located with respect to the IR or iris camera to obtain an image suitable for performing iris recognition.

The techniques described herein provide a number of advantages. These include providing an easy way for a user to navigate eyes into the identifying ROI through the preview stream from front color sensor. Also, techniques described herein also automatically trigger the capture a high quality raw picture from IR sensor when the body part is in the proper location with respect to the narrow view angled IR camera (e.g., eyes in ROI, eyes open detected by the ready face component detection and/or blink detection for front color sensor system).

An Example of a Device with Image Capture Functionality

Figure 7:
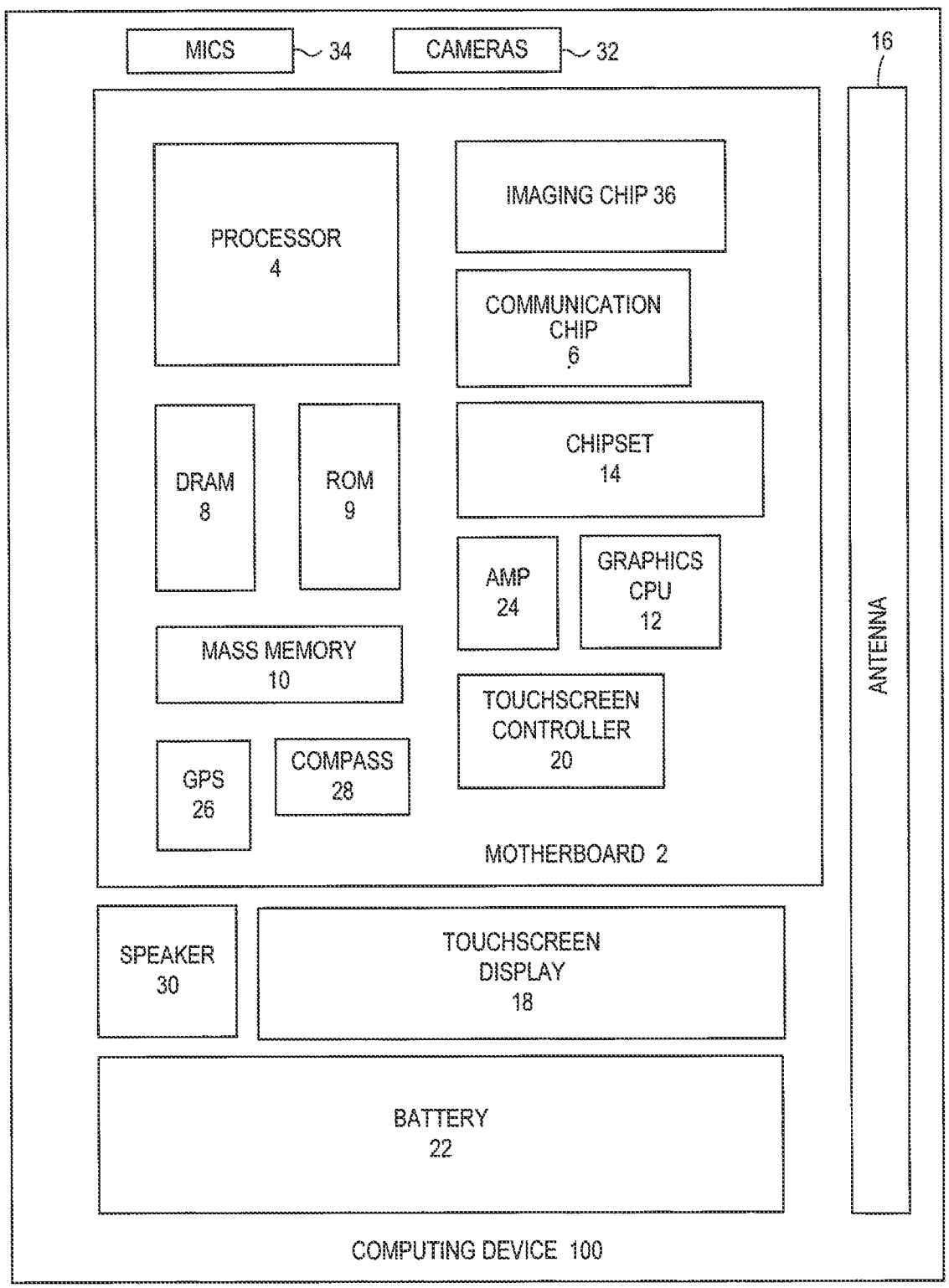
FIG. 7 illustrates a portable image capture device in accordance with one implementation.

FIG. 7 illustrates a portable image capture device 100 in accordance with one implementation. The imaging device 100 houses a system board 2. The board 2 may include a number of components, including but not limited to a processor 4 and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The one or more cameras 32 include the cameras described above. The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images, including the operations described above. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

Cameras 32 may include all of the components of the camera or share resources, such as memory 8, 9, 10, processing 4 and user interface 12, 20, with other video device components and functions. The processor 4 is coupled to the camera and to memory to receive frames and produce enhanced images. In one embodiment, cameras 32 include an image capture sensor(s) and color filter array describe above. In one embodiment, cameras 32 also include an image processing system, as described above.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

In a first example embodiment, a method comprises sending image data to a display of device that is captured with a first camera of the device with an indication to guide a user to position a body part of the user with respect to the display while the image data is being sent to the display, providing feedback to the user to indicate to the user that the body part is in position so that an image of the body part can be captured by a second camera of the device, capturing an image of the body part with the second camera, and performing recognition on the body part using the image.

In another example embodiment, the subject matter of the first example embodiment can optionally include that the indication comprises a first graphic displayed on the display that is mapped to the field of view of the second camera and into which the body part is positioned on the display to enable capture of the image of the body part.

In another example embodiment, the subject matter of the first example embodiment can optionally include that the feedback comprises replacing the first graphic with a second graphic.

In another example embodiment, the subject matter of the first example embodiment can optionally include that the feedback comprises changing a color of the first graphic.

In another example embodiment, the subject matter of the first example embodiment can optionally include that the indication comprises one or both of text and graphics on the display to direct the user to position the body part with respect to the display.

In another example embodiment, the subject matter of the first example embodiment can optionally include that the indication comprises using one or more of light on the display or audio to direct the user to position the body part with respect to the display.

In another example embodiment, the subject matter of the first example embodiment can optionally include detecting whether the body part is in the area of the display mapped to the field of view of the second camera.

In another example embodiment, the subject matter of the first example embodiment can optionally include that the body part comprises eyes of the user and performing recognition on the body part comprises performing iris recognition.

In another example embodiment, the subject matter of the first example embodiment can optionally include that the body part comprises a face of the user and performing recognition on the body part comprises performing face recognition.

In another example embodiment, the subject matter of the first example embodiment can optionally include that the first camera is a red-green-blue (RGB) camera and the second camera is an infrared (IR) camera.

In a second example embodiment, a device comprises a display, a first color camera subsystem operable to capture image data with a first color camera and send the image data to the display with an indication to guide a user to position a body part of the user with respect to the display while the image data is being sent to the display, a second camera operable to capture an image of the body part, a feedback mechanism (e.g., displayed graphics, sound, text, etc.) to provide feedback to the user to indicate to the user that the body part is in position for image capture by the second camera, wherein the second camera is operable to capture the image of the body part automatically in response to the body part being in position for capture of the image of the body part by the second camera of the device and a processor to perform recognition on the body part using the image captured by the second camera.

In another example embodiment, the subject matter of the second example embodiment can optionally include that the indication comprises a first graphic displayed on the display that is mapped to the field of view of the second camera and into which the body part is positioned on the display to enable capture of the image of the body part.

In another example embodiment, the subject matter of the second example embodiment can optionally include that the feedback comprises replacing the first graphic with a second graphic.

In another example embodiment, the subject matter of the second example embodiment can optionally include that the feedback comprises changing a color of the first graphic.

In another example embodiment, the subject matter of the second example embodiment can optionally include that the indication comprises one or both of text and graphics on the display to direct the user to position the body part with respect to the display.

In another example embodiment, the subject matter of the second example embodiment can optionally include that the indication comprises using one or more of light on the display or audio to direct the user to position the body part with respect to the display.

In another example embodiment, the subject matter of the second example embodiment can optionally include that the feedback mechanism is operable to detect whether the body part is in the area of the display mapped to the field of view of the second camera.

In another example embodiment, the subject matter of the second example embodiment can optionally include that the body part comprises eyes of the user and performing recognition on the body part comprises performing iris recognition.

In another example embodiment, the subject matter of the second example embodiment can optionally include that the body part comprises a face of the user and performing recognition on the body part comprises performing face recognition.

In another example embodiment, the subject matter of the second example embodiment can optionally include that the first camera is a red-green-blue (RGB) camera and the second camera is an infrared (IR) camera.

In a third example embodiment, an article of manufacture having one or more non-transitory computer readable storage media storing instructions which when executed by a device to perform a method comprising: sending image data to a display of a device that is captured with a first camera of the device with an indication to guide a user to position a body part of the user with respect to the display while the image data is being sent to the display; providing feedback to the user to indicate to the user that the body part is in position so that an image of the body part can be captured by a second camera of the device; capturing an image of the body part with the second camera; and performing recognition on the body part using the image.

In another example embodiment, the subject matter of the third example embodiment can optionally include that the indication comprises a first graphic displayed on the display that is mapped to the field of view of the second camera and into which the body part is positioned on the display to enable capture of the image of the body part.

In another example embodiment, the subject matter of the third example embodiment can optionally include that the feedback comprises changing a color of the first graphic or replacing the first graphic with a second graphic.

In another example embodiment, the subject matter of the third example embodiment can optionally include that the method further comprises detecting whether the body part is in the area of the display mapped to the field of view of the second camera.

Some, portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated, it has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   causing, by executing instructions with at least one processor, image data and a first indication to be displayed via a display of a device, the image data associated with a first camera of the device, the first indication to guide a user to position a body part of the user with respect to the display, the first indication indicative of a field of view of a second camera of the device;
detecting that the body part is within the field of view of the second camera, the field of view of the second camera narrower than a field of view of the first camera;
in response to detecting that the body part is within the field of view of the second camera:
causing, by executing instructions with the at least one processor, the display of the first indication to be terminated; and
causing, by executing instructions with the at least one processor, a second indication to be displayed on the display, the second indication indicative of a position of the body part within the field of view of the second camera;
causing, by executing the instructions with the at least one processor, the second camera to capture an image of the body part; and
performing, by executing the instructions with the at least one processor, recognition of the body part using the image.

2. The method defined in claim 1, wherein the first indication includes a first graphic representative of a mapping of the field of view of the second camera with respect to the display.

3. The method defined in claim 2, wherein the second indication includes a second graphic.

4. The method defined in claim 3, wherein the first graphic has a first color and the second graphic has a second color, the second color different than the first color.

5. The method defined in claim 1, wherein the first indication includes one or more of text or graphics.

6. The method defined in claim 1, wherein the body part includes one or more eyes of the user and performing recognition of the body part includes performing iris recognition.

7. The method defined in claim 1, wherein the first camera is a red-green-blue (RGB) camera and the second camera is an infrared (IR) camera.

8. The method defined in claim 1, further including causing a third indication to be displayed on the display simultaneously with the first indication, the third indication associated with one or more of a focal depth or focal distance of the second camera.

9. The method defined in claim 1, wherein the image of the body part is a first image and wherein the image data associated with the first camera includes a second image of the user.

10. A device comprising:
a display;
a first camera to output first image data;
a second camera to output second image data, the second image data including an image of a body part of a user; and
processor circuitry to:
cause the first image data and a first indication to be displayed via the display, the first indication to guide the user to position the body part of the user with respect to the second camera, the first indication indicative of a field of view of the second camera;
detect that the body part is within the field of view of the second camera, the field of view of the second camera narrower than a field of view of the first camera;
in response to the detection that the body part is within the field of view of the second camera, cause a second indication to be displayed via the display, the second indication indicative of a position of the body part within the field of view of the second camera, the second indication to be displayed after the first indication; and
perform recognition of the body part using the second image data.

11. The device defined in claim 10, wherein the first indication includes a first graphic defining an area of the display corresponding to the field of view of the second camera.

12. The device defined in claim 11, wherein the second indication includes a second graphic.

13. The device defined in claim 12, wherein the first graphic has a first color and the second graphic has a second color, the second color different than the first color.

14. The device defined in claim 10, wherein the first indication includes one or more of text or graphics.

15. The device defined in claim 10, wherein the body part includes one or more eyes of the user and the processor circuitry is to perform recognition of the body part by performing iris recognition.

16. The device defined in claim 10, wherein the first camera is a red-green-blue (RGB) camera and the second camera is an infrared (IR) camera.

17. The device defined in claim 10, wherein the processor circuitry is to cause a third indication to be displayed on the display simultaneously with the first indication, the third indication associated with one or more of a focal depth or focal distance of the second camera.

18. The device defined in claim 10, wherein the image of the body part of the user is a first image and wherein the first image data includes a second image of the user.

19. An article of manufacture having one or more non-transitory computer readable storage media comprising instructions that, when executed by one or more processors of a device, cause the one or more processors to at least:
cause image data and a first indication to be displayed on a display of the device, the image data associated with a first camera of the device, the first indication to guide a user to position a body part of the user, the first indication representing a field of view of a second camera of the device;
detect that the body part is within the field of view of the second camera, the field of view of the second camera narrower than a field of view of the first camera;
in response to the detection that the body part is within the field of view of the second camera, cause a second indication to be displayed on the display, the second indication associated with a position of the body part within the field of view of the second camera;
cause the second camera to capture an image of the body part; and
perform recognition of the body part using the image.

20. The article of manufacture defined in claim 19, wherein the first indication includes a first graphic illustrating the field of view of the second camera relative to the display.

21. The article of manufacture defined in claim 20, wherein the first graphic has a first color and the second indication includes a second graphic having a second color, the second color different than the first color.

22. The article of manufacture defined in claim 19, wherein the body part includes one or more eyes of the user and the instructions, when executed, cause the one or more processors to perform recognition of the body part by performing iris recognition.

23. The article of manufacture defined in claim 19, wherein the image of the body part is a first image and wherein the image data associated with the first camera includes a second image of the user.

24. The article of manufacture defined in claim 19, wherein the instructions, when executed, cause the one or more processors to cause a third indication to be displayed on the display simultaneously with the first indication, the third indication associated with one or more of a focal depth or focal distance of the second camera.

\* \* \* \* \*